Figure 1:
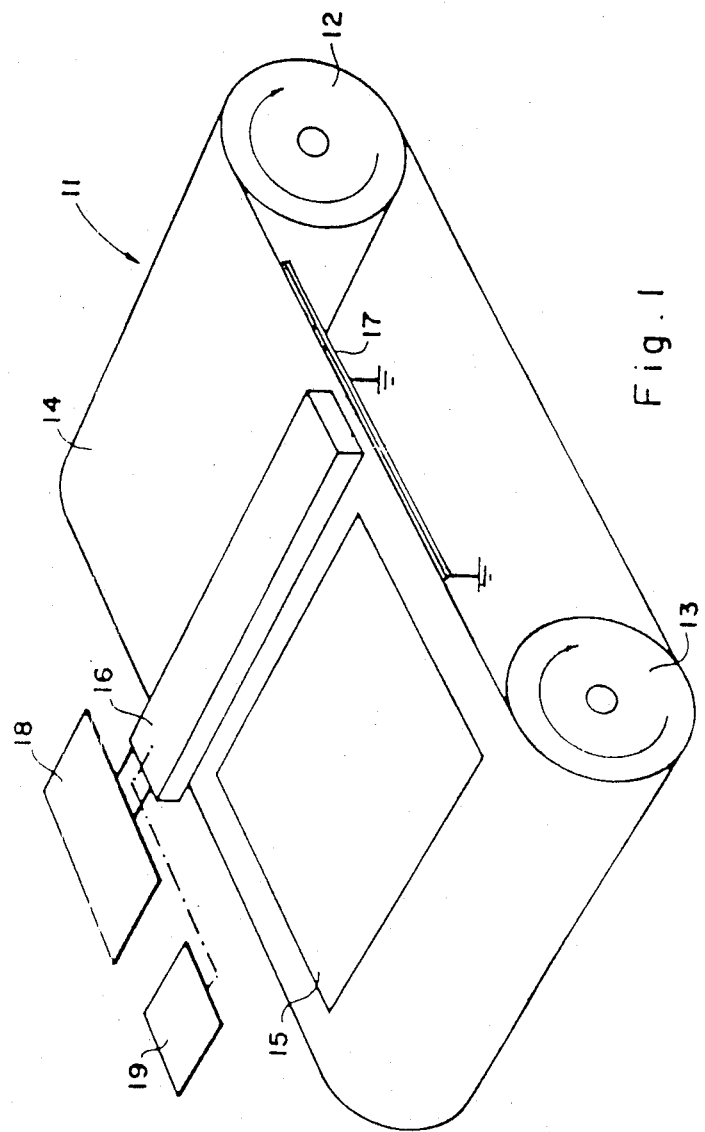

United States Patent [19]

Shapir

[11] Patent Number: 4,502,064
[45] Date of Patent: Feb. 26, 1985

[54] PAGE PRINTER

[75] Inventor: Ben A. Shapir, Ramat-Gan, Israel

[73] Assignee: Avmat Computers Ltd., Tel-Aviv, Israel

[21] Appl. No.: 534,662

[22] Filed: Sep. 22, 1983

[51] Int. Cl.³ .............................................. G03G 15/00
[52] U.S. Cl. .................................. 346/160; 355/3 R; 430/31
[58] Field of Search .................... 355/1; 101/DIG. 1; 358/300; 346/153.1, 160, 155, 107 R

[56] References Cited

U.S. PATENT DOCUMENTS

| | | | |
|---|---|---|---|
| 3,530,441 | 9/1970 | Ovshinsky | 346/107 R |
| 3,952,311 | 4/1976 | Lapeyre | 346/107 R |
| 4,208,697 | 6/1980 | Fischer | 355/3 CH |
| 4,279,483 | 7/1981 | England | 355/1 |

Primary Examiner—A. T. Grimley
Assistant Examiner—D. Warren
Attorney, Agent, or Firm—Browdy and Neimark

[57] ABSTRACT

A page printer for selectively printing on a paper, including means for selectively charging the paper by applying radiant energy to selected portions to cause electrons to be removed from the normal bond, applying a high voltage field to prevent the removed electrons from returning to the paper, thereby charging the paper, applying and then fixing the toner to obtain the desired printout. The means for selectively applying radiant energy can be a field of light emitting diodes or scanning circuit means for selecting the LEDs of the field to be energized. The means for selectively supplying radiant energy can operate responsive to input information from a computer, memory means, or responsive to keyboard input information.

9 Claims, 4 Drawing Figures

PAGE PRINTER

This invention is concerned with modern page printing apparatus and more particularly with unique variations of the Xerography printing system.

Printing has made amazing strides in the last half century. However as far reaching as the improvements in printing processes and systems have been they still have not kept up with the even greater increase in the necessity of the printed page. In the age of computers page printers are in great demand.

One of the many improvements in the printing process has been the Xerographic printing or copying process first developed in the 1930's and which is in wide use at this time. In the Xerographic process paper coated with a semi-conductor is charged in the dark. The image is then projected on the charged paper to discharge those portions of the paper on which light impinges. Thus, the portions of the paper that remain charged are those portions on which the projection of the image impinged. A toner powder is then applied which is oppositely charged and therefore sticks to the charged portions of the paper. The toner is then set by heat or the like. There are variations of the Xerography process but basically that is it.

There are some faults with the Xerography process. For example, the necessity for charging the complete page that is being printed on, then discharging that page with the negative of the image to be printed rather than merely charging that portion of the page on which printing is to remain appears inefficient.

Thus far, the Xerographic method has not found wide use in conjunction with computers as page printers. There are certain systems wherein high voltage electrodes are used for applying the charge selectively to form letters and the like to the paper and then applying the toner and the fixer thereto in the normal Xerographic method. A big drawback with such systems, of course, is that high voltages are switched to the selective electrodes. Maintaining the high voltage fields for the switching and using the high voltage in the control switching is hard on components and therefore the resulting system is not the most reliable of systems and as a matter of fact has not found widespread usage.

It is an object of the present invention to provide a new and improved page printer in which the above referred to disadvantages are substantially reduced or overcome.

According to the present invention a page printer for selectively printing on paper is provided, said page printer comprising:

means for selectively charging said paper, said selective charging means comprising means for generally applying a high voltage field proximate to said paper, means for selectively applying light band radiant energy to portions of said paper to selectively charge said paper by causing electrons to be removed from their normal bonds, and means responsive to said selective charges for applying toner and fixing said toner to obtain the desired print-out on said paper.

According to a feature of the present invention a method of paper printing is provided, said method comprising the steps of:

generating a high voltage field, applying said high voltage field generally to a page to be printed, selectively applying light bond radiant energy to said page to charge areas of said page in the form of desired characters to be printed, applying toner to said charged areas, and fixing said applied toner to provide a printed page.

In a feature of the invention the paper is coated with a semi-conductor coating that is characterized by the relatively small high voltage required to remove the electrons from their normal bonds, or to put it another way, wherein the well in which said electrons are located is less deep than in normal paper.

Another feature of the invention utilizes a light emitting diode to supply the desired radiant energy. Low voltages are used to control the emission of the light emitting diode. Yet a further feature of the invention utilizes a series of light emitting diodes arranged in a dot matrix that are controlled to apply light energy to selected areas of said page as the paper moves past a scanner comprising the light emitting diodes. The light emitting diodes have the high voltage field biasing voltage on one side thereof whereby small amounts of light energy can cause the page to charge.

Yet another feature of the invention utilizes microprocessor controlled scanning circuitry for selectively applying the control voltages to the scanner to acquire the desired charge on the paper of the page to be printed.

Figure 3:
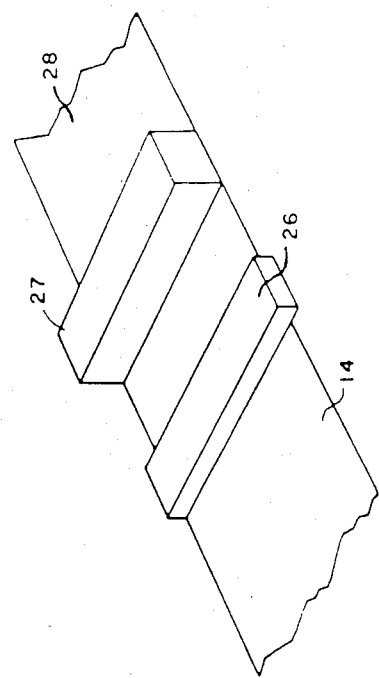
Figure 2:
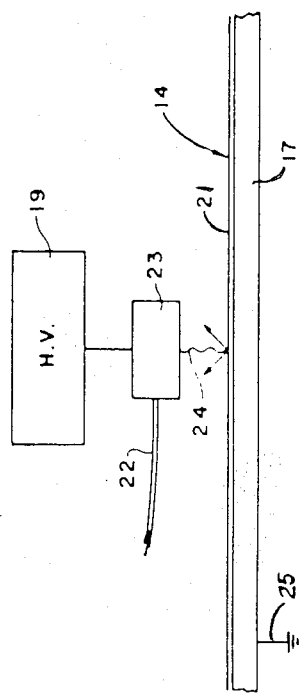
Figure 4:
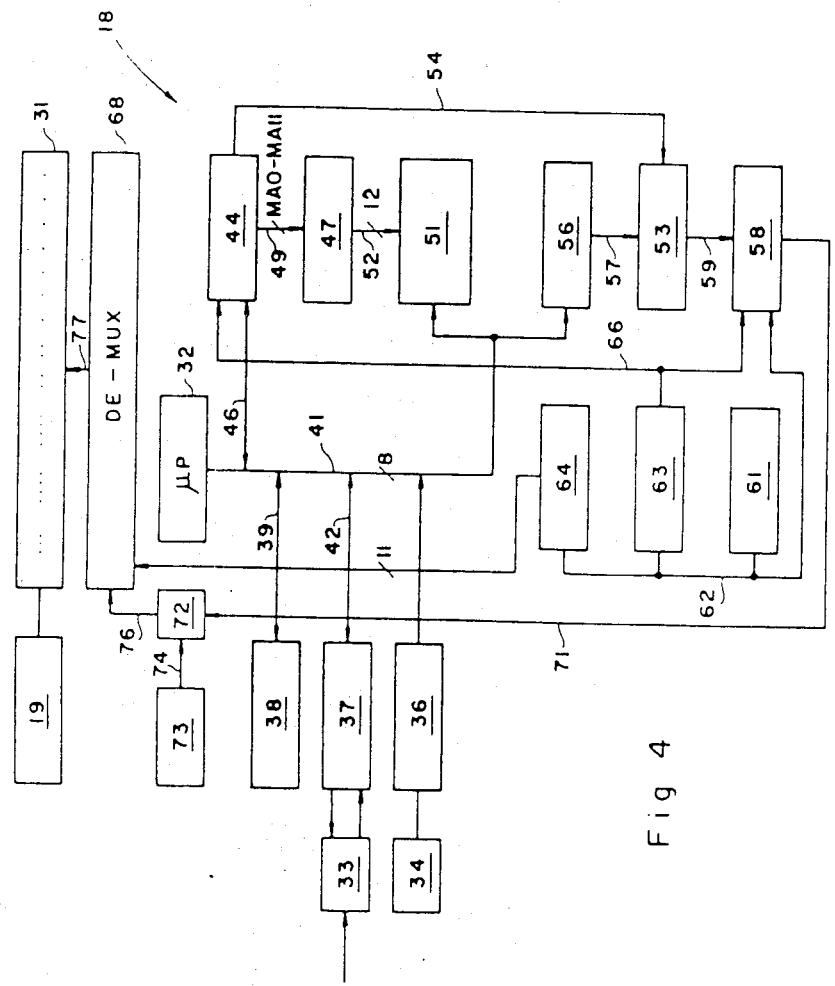

The operation and utilization of the present invention will be more fully apparent from the description of a preferred embodiment taken in conjunction with the following drawings, in which:

FIG. 1 is a block pictorial diagram showing the inventive page printer,

FIG. 2 in block diagram form shows the light emitting diode used for applying the radiant energy in conjunction with the high voltage field to the paper, FIG. 3 pictorially illustrates the toner and fixer application portions of the system, and FIG. 4 is a block diagram of the electronic control circuitry of a preferred embodiment of the inventive page printer.

In FIG. 1 the system generally shows a first roll of paper which could be treated or untreated moving to a second roll of paper. The motion of the paper from one roll to the other is accomplished in any well known manner. It is within the scope of the invention to have sheets of paper pass by the area where the charging is accomplished. In greater detail the page printer 11 shown in FIG. 1 comprises means for moving paper in this case a motivating roller 12 moved by a motor connected to the roller axle in any well known fashion. An idler roller 13 provides the paper 14 to the motivating roller 12. The paper in going from roller 13 to roller 12 passes by a printing head 16 which is positioned over a rounded base 17. Electronic control circuitry 18 controls the application of the high voltage applied by block 19 to the printing head 16. Thus generally speaking the high voltage is not what is controlled for providing the selective charging to the paper.

FIG. 2 shows a portion of the printing head comprising a high voltage field which in a preferred embodiment may be in the range of approximately three million volts per meter. The high voltage field supply 19 is used for applying a high voltage to the paper 14 which in the preferred embodiment is shown as having a semi-conductor coating 21. In addition when a control signal is applied to control junction 22 of the light emitting diode 23 then the diode emits a ray of light 24 which preferably is in the visible spectrum. The quantums of light contain enough energy to cause the electrons in the coating to break the bond or escape from the well. The biasing of the high voltage field 19 will pull the electron away from the paper and then charge the paper. The base 17 is normally from a conducting metal grounded at 25.

The printing head 16 shown more or less schematically in FIG. 1 is understood as shown in FIG. 3 to contain a portion that applies toner shown as toner applicator portion 26 and a fixing portion 27 for fixing the toner that is applied to charge the paper. Thus the portion of the paper 28 that is seen after the fixer is that portion of the paper on which the printing appears.

It should be understood that many different types of control circuitry could be used. The control circuitry of FIG. 4 is described merely by way of example, the chief feature of the invention being the utilization of radiation energy in conjunction with a biasing high voltage field to selectively charge paper to obtain the page printer. In FIG. 4 the dot matrix portion 31 of the printing head 16 is shown as being connected to the high voltage supply 19. While a dot matrix form is shown it should be understood that the well known 7 segment arrangement could also be used as well as many different arrangements which are virtually available or are even not available as yet but are known to those skilled in the art. The control system 18 is shown as being under the control of a microprocessor unit 32. The input to the control circuitry are obtained through computer interface 33 for example, or in addition the input to the control system can be obtained through a keyboard 34 operating through interface 36.

When the control system is operating from a computer then a commercial translator 37 for translating from the computer code to another code, for example, as desired or required.

The EPROM program is shown at block 38. The program operates in conjunction with the microprocessor unit, being connected over conductor 39 to microprocessor bus 41. Similarly the commercial translator is connected to the microprocessor bus 41 through conductor 42 and also the interface 36 is connected to the bus through conductor 43.

A cathode ray tube controller is shown in the circuitry for the option of viewing the printouts on a cathode ray tube as desired. The controller is shown as CRT controller 44 coupled to the microprocessor unit through conductor 46. A first multiplex unit is shown at block 47 connected to the microprocessor unit through conductor 48 and to the CRT controller through conductor 49. The multiplex unit 47 receives input from the microprocessor and from the CRT controller.

The output of the miltiplex unit 47 is fed into a 4K random access memory 51 over conductor 52. A read only memory 53 receives the row address information from the CRT controller over conducters 54. The read only memory 53 is also connected to an 8 bit latch 56 over conductor 57. The output of the read only memory goes to a shift register 58 over conducters 59. The shift register is a parallel in and serial out type shift register. It obtains its shift data information from a clock generator 61 over clock generator bus 62. The clock generator also is connected to a divide by 5 divider circuit 63 and a divide by 400 divider circuit 64. The output of the divider circuit 63 is connected to the shift register over bus 66 and also to the CRT controller. The shift register is connected to bus 66 through conductor 67.

The output of the divider 64 also is applied to a e-Mux unit 68. The unit 68 obtains control voltage responsive to a signal from the shift register 58 over conductor 71 connected to gate 72. The gate 72 enables the control voltage from control voltage supply 73 to extend to the unit 68 over conductor 74 through the gate and conductor 76. The unit 68 is connected to the dot matrix portion of the printing head 31 through conductor 77.

In operation then computer output is translated and according to the program in the EPROM is applied to the output De-Mux unit 68 to energize the desired light emitting diode that enables a beam of light to go through a selected dot of the dot matrix. As the paper moves line by line of the dots, the paper is selectively charged to print the letters making up the words, sentences and lines desired.

Note that the high voltage is a constant high voltage supply and not a switched supply with problems of transients. Thus an efficient high speed page printer is provided that uses Xerographic methods by combining light emission with a high voltage field to selectively charge the paper being printed.

While the principles of the invention have been described above in connection with specific apparatus and applications, it is understood that this description is made by way of example only and not as a limitation on the scope of the invention.

I claim:

1. A page printer for selectively printing on a paper, said page printer comprising:
   means for selectively charging said paper,
   said selective charging means comprising means for selectively applying radiant energy to selected portions of said paper to cause electrons to be removed from the normal bond,
   means for generally applying a high voltage field proximate to said paper to prevent the removed electrons from returning to said paper, thereby charging said paper,
   means responsive to said selective charges for applying toner, and
   means for fixing said toner to obtain the desired printout.

2. A page printer of claim 1 wherein said paper is coated with a semi-conductor material.

3. The page printer in accordance with claim 1 wherein said means for selectively applying radiant energy is a field of light emitting diodes.

4. The page printer of claim 3 wherein said field of light emitting diodes comprises LEDs arranged in a matrix configuration wherein the dots are in a single line.

5. The page printer of in accordance with claim 3 wherein said means for selectively supplying radiant energy comprises scanning circuit means for selecting the LED's of said field to be energized.

6. The page printer of claim 1 wherein said means for selectively supplying radiant energy operate responsive to input information from a computer.

7. The page printer of claim 1 wherein said means for selectively supplying radiant energy operates responsive to input information from memory means.

8. The page printer of claim 1 wherein said means for selectively supplying radiant energy means operates responsive to key board input information.

9. The page printer in accordance with claim 4, wherein said means for selectively supplying radiant energy comprises scanning circuit means for selecting the LED's of said field to be energized.

* * * * *